United States Patent
Posselt et al.

(10) Patent No.: US 6,237,349 B1
(45) Date of Patent: May 29, 2001

(54) PRESSURE BUILD-UP EVAPORATOR

(75) Inventors: Heinz Posselt, München; Horst Rüdiger, Augsburg, both of (DE)

(73) Assignee: Linde Aktiengesellschaft, Wiesbaden (DE)

(*) Notice: Subject to any disclaimer, the term of this patent is extended or adjusted under 35 U.S.C. 154(b) by 0 days.

(21) Appl. No.: 09/428,484

(22) Filed: Oct. 28, 1999

(30) Foreign Application Priority Data

Oct. 28, 1998 (DE) ............................................. 198 49 766

(51) Int. Cl.[7] ......................................................... F17C 7/02
(52) U.S. Cl. ................................................................ 62/50.1
(58) Field of Search ..................................... 62/50.1

(56) References Cited

U.S. PATENT DOCUMENTS 5,937,655 * 8/1999 Weiler et al. .......................... 62/50.1

FOREIGN PATENT DOCUMENTS

4212636A1  10/1993  (DE) .

* cited by examiner

Primary Examiner—William Doerrler
Assistant Examiner—Malik N. Drake
(74) Attorney, Agent, or Firm—Millen, White, Zelano & Branigan, P.C.

(57) ABSTRACT

A device for increasing pressure in a storage container for cryogenic liquids comprises a housing within a storage container, the housing having at least one intake opening for liquid and, inside, a heating device for evaporating liquid. A vapor line is arranged in the upper third of the housing to remove the vapor bubbles that are produced during evaporation. The cross-section of the vapor line is large so that when the device is operated, more vapor than liquid, preferably only vapor, exhausts through the vapor line.

23 Claims, 1 Drawing Sheet

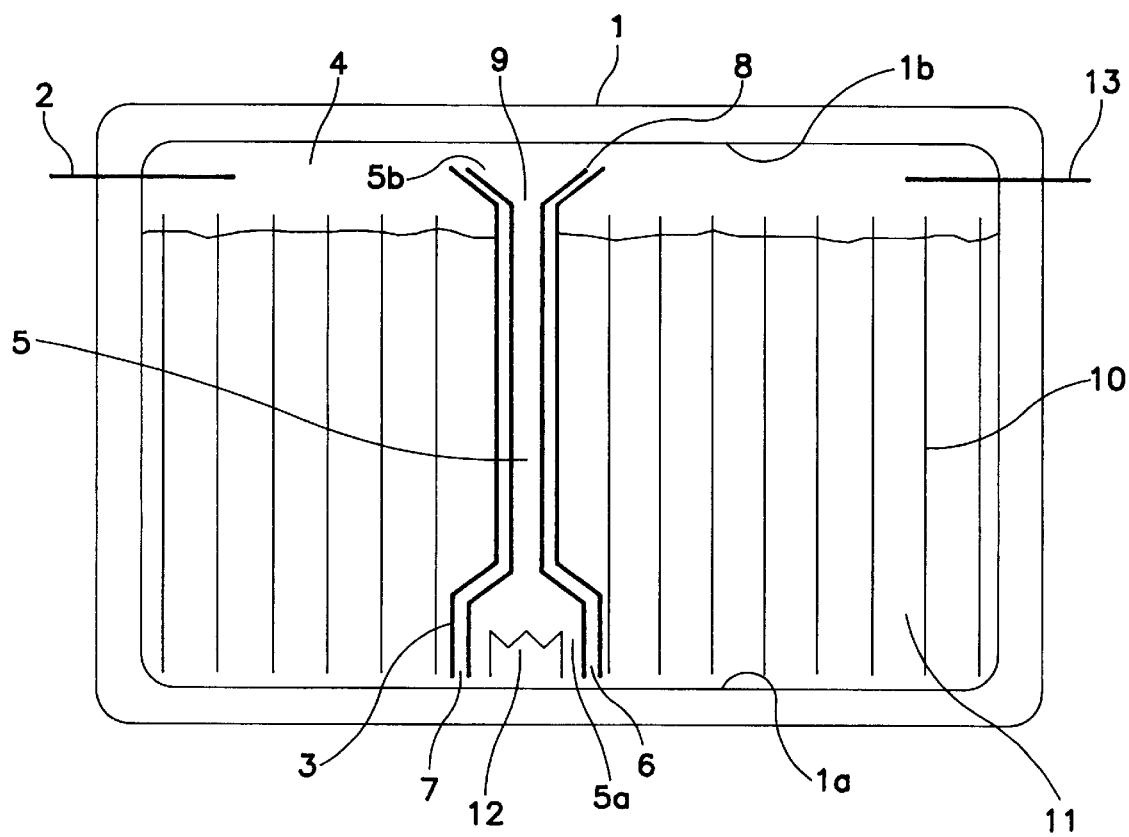

PRESSURE BUILD-UP EVAPORATOR

RELATED APPLICATION

Co-pending U.S. patent application Ser. No. 09,428,483 filed Oct. 28, 1999, of Horst Rüidiger entitled "Storage Container for Liquified Gases".

FIELD OF THE INVENTION

The invention relates to a device for pressure build-up in a storage container for cryogenic liquids with a housing that has at least one intake opening for liquid and, inside, a heating device for evaporating liquid as well as a vapor line that is arranged in the upper third of the housing to remove vapor bubbles that are produced during evaporation.

BACKGROUND OF THE INVENTION

In the future, in view of the emissions burden that is caused by traffic, hydrogen will be used increasingly as a fuel for motor vehicles, aircraft and ships. The storage of hydrogen on board these vehicles is suitably carried out in liquid form, since based on the low density of gaseous hydrogen, the storage capacity would otherwise be only very limited. The hydrogen is therefore cooled to about 25 K and introduced into the storage tank that is in the vehicle at a pressure of 3 to 4 bar.

If a combustion engine is used as a drive assembly, the filling pressure of 3 to 4 bar is just enough for proper operation of the engine. When fuel cells are used to power vehicles, however, at this time a hydrogen supply under a pressure of 10 bar is necessary. Storage of hydrogen at a pressure of 10 bar and a corresponding equilibrium temperature of about 31 K is disadvantageous, however, since the storage capacity clearly drops because the density of the liquid hydrogen decreases with rising temperature.

In practice, therefore, the hydrogen that is stored at a pressure of 3 to 4 bar is first compressed to 10 bar, before it is fed to the fuel cell. The pressure increase can be achieved by, for example, introducing additional gaseous hydrogen into the storage tank or by evaporating a portion of the liquid hydrogen. Such a device for pressure build-up is known from, for example, DE 42 12 626 A1. In this connection, a gaslift is attached to the bottom of the storage tank, in which liquid hydrogen that enters into the gaslift with use of the pump heating is partially evaporated. The gas bubbles that are produced in this case entrain liquid hydrogen via a rising main upward into the gas chamber of the storage tank, where the latter is ultimately evaporated with use of an evaporator-heating system.

SUMMARY OF THE INVENTION

A feature of this invention is to provide a device of the type mentioned above, which offers a simple, quick and reliable option of pressure build-up in a storage container for cryogenic liquids.

This feature is achieved according to the invention in that the cross-section of a vapor line is large so that during operation of the device, more vapor than liquid, preferably basically only vapor, is drained off through the vapor line.

With use of the device according to the invention, only a small part of the cryogenic liquid that is in the storage container is evaporated in the container to increase pressure. For this purpose, a housing that has at least one intake opening for liquid is provided in the container. Inside the housing is a heating device, by means of which a portion of the liquid is evaporated. The vapor that is produced in this case is drained off via a vapor line into the header of the storage container. The cross-section of the vapor line is selected in this case so that the flow resistance of the gas bubbles is small so that the latter do not entrain any liquid or entrain only a little liquid. In contrast to the prior art gaslift or bubble column, no second heating in the header of the storage container is necessary for evaporation of liquid that is carried upward.

The cross-section area of the vapor line is advantageously larger than the sum of the cross-section areas of the vapor bubbles that simultaneously pass through the cross-section area of the steam line during operation of the device. The cross-section of the vapor line is consequently designed based on the output of the heating device.

The vapor line is preferably arranged at the highest point of the housing. In this way, essentially only steam is present at the introduction of the vapor line, so that it is almost completely impossible to carry the liquid through the vapor line.

Only a portion of the liquid used to increase pressure in the storage container is to be evaporated by the invention. Accordingly, the temperature of the residual liquid stored in the storage container is, as much as possible, not to be changed. With the evaporation of a portion of the liquid that is in the housing, heating of the remaining liquid in the housing unavoidably coincides. To avoid heating the liquid that is outside of the housing, the housing and/or vapor line is advantageously thermally insulated.

The insulation of the housing and/or the vapor line is carried out preferably in that the latter is designed with double walls, and the gap between the two walls has an intake opening for vapor and/or liquid.

It has proven advantageous to provide a device for retaining the liquid on the end of the vapor line that is not connected to the housing. This retention device collects liquid, which is carried along with the vapor despite the dimensioning of the vapor line according to the invention. In this way, a mixing of heated liquid, which was unintentionally transported by the vapor line into the header of the storage container, with the remaining liquid is avoided.

In extensive tests, it has been shown that with use of the device according to the invention for pressure build-up in a storage container for liquid hydrogen, the minimum expansion of the vapor line in the cross-section should be more than 5 mm, preferably more than 10 mm, especially preferably more than 20 mm. These conditions ensure that basically only gaseous hydrogen is carried through the vapor line.

In addition to the device for pressure build-up in a storage container, the invention also relates to a storage container for cryogenic liquids. Inside, preferably near its bottom, the storage container has a housing, which has at least one intake opening for liquid and, inside, a heating device for evaporating the liquid. Between the housing and a point above the maximum filling height of the storage container, there runs a vapor line for draining off vapor bubbles that are produced during evaporation. According to the invention, the cross section of the vapor line is large, so that more vapor than liquid is drained off through the vapor line.

After the pressure is increased, however, the liquid and the gaseous hydrogen in the storage tank are in a state of thermal imbalance, since the liquid has a temperature of about 25 K, while in the gas atmosphere, a temperature of 31 K exists. The thermodynamic system that is present in the tank is therefore induced by return condensation of hydrogen gas to create a balancing of the thermal ratios of gas and liquid.

Such a storage container is therefore advantageously improved in that the storage container is divided into cells by a considerable number of partitions, which consist of a low heat-conducting material, and the cells' maximum expansion in a plane that is perpendicular to the partitions is less than 50 mm, preferably less than 10 mm, especially preferably less than 5 mm. Based on the use of partitions in the storage container and the dimensioning according to the invention of the cells that result from this, it is therefore ensured that a liquid that is stored in the storage container is kept in the temperature range that is already present or specifically created.

The invention is of value in particular in the storage of liquid hydrogen in a motor vehicle.

BRIEF DESCRIPTION OF THE DRAWING

The invention and further details of the invention are explained in more detail below based on the embodiments that are depicted in the drawings.

FIG. 1 is a side elevation of a storage tank configured in accordance with the present invention.

DETAILED DESCRIPTION

The figure depicts a storage container 1 for a hydrogen-powered vehicle with fuel cell technology, which during operation requires hydrogen under a pressure of 10 bar. To be able to store the largest amount of hydrogen in storage container 1, the hydrogen is first introduced at low pressure, for example 1 to 4 bar, in storage container 1 via feed line 2. During operation, the pressure is then increased in container 1 by evaporating liquid.

In this connection, a housing 3, to which is connected a vapor line 5 that projects from the highest point of housing 3 up to header 4 of storage container 1, is on the bottom 1a of storage container 1. The vapor line 5 has a first end 5a proximate the floor 1a of the storage container 1 and a second end 5b which opens in the header space 4 proximate the ceiling 1b of the housing 1. Vapor line 5 has a diameter of 20 mm. Housing 3 and steam line 5 have double walls, whereby gap 6 that exists between the walls has intake and output openings 7,8, respectively, for liquid or gas. The liquid or gaseous hydrogen that penetrates through these intake openings 7, 8 in gap 6 is used for insulation between the gaseous hydrogen that rises in vapor line 5 and the liquid hydrogen that surrounds the housing.

Storage container 1 is separated by a considerable number of partitions 10 that are arranged in a perpendicular manner and that are molded and bonded together so that a honeycomb structure is produced in the cross-section. Maximum expansion 11 of one of these honeycomb cells in a plane that is perpendicular to partitions 10 is 6 mm. The partitions themselves consist of a knit fabric that is impregnated in resin and that is liquid impermeable and of low heat conduction.

To increase pressure in storage container 1, a portion of the liquid hydrogen is evaporated by using a heating element 12 disposed in the first end 5a of the vapor line 5. The vapor bubbles thus produced rise by vapor line 5 into header 4 space. Based on the relatively large diameter of steam line 5 of 20 mm, basically only vapor is vented upward, so that in entire header 4, elevated pressure is set via the liquid hydrogen. Nevertheless, should liquid be conveyed upward, the latter is collected in funnel-shaped enlargement 9 of steam line 5.

After initial return condensation of gaseous hydrogen from header 4, the topmost liquid layers form an insulating layer, which prevents another return condensation. In this way, it is possible to maintain in header 4 a pressure of 10 bar, which corresponds to a boiling temperature of about 31 K, while the liquid hydrogen is undercooled to about 25 K. The additional separation of storage container 1 into individual cells in this case prevents movements of liquid in storage container 1, which could result in destruction of the temperature gradient in the liquid hydrogen. The gaseous hydrogen is fed via line 13 communicating with the header space 4 to the fuel cells.

The invention thus makes it possible to make hydrogen available, which hydrogen is stored in liquid form at low temperature and in gaseous form under high pressure of, for example, 10 bar.

From the foregoing description, one skilled in the art can easily ascertain the essential characteristics of this invention, and without departing from the spirit and scope thereof, can make various changes and modification of the invention to adapt it to various usages and conditions.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The entire disclosure of all applications, patents and publications, cited above, and of German Patent Application No. 198 49 766.0 filed Oct. 28, 1998, are hereby incorporated in their entirety by reference.

What is claimed is:

1. A device for pressure build-up in a storage container for cryogenic liquids, the device comprising:

a housing, which has at least one intake opening for liquid and an inner wall surface, a heater within the housing for evaporating liquid, and a vapor line within the housing having an outlet positioned at least within the upper third of the housing to exhaust into a header space vapor bubbles produced during evaporation and generated by the heater within the housing, the vapor line having a cross-sectional area such that the vapor line is large enough so that when the device is operated, more vapor than liquid exhausts through the vapor line.

2. A device according to claim 1, wherein the cross-sectional area of the vapor line is larger than the sum of cross-sectional areas of vapor bubbles that simultaneously go through these cross-sectional areas of the vapor line during operation of the device.

3. A device according to claim 2, wherein the vapor line is disposed at the top of the housing.

4. A device according to claim 3, wherein the housing and the vapor line are thermally insulated.

5. A device according to claim 4, wherein the housing and the vapor line are configured with double walls having a gap therebetween with an intake opening for vapor, liquid or a mixture of vapor and liquid.

6. A device according to claim 5, wherein a retaining device for retaining liquid is provided at the end of the vapor line, the retaining device being spaced from the inner wall surface of the housing.

7. A device according to claim 6 used for pressure increase in a storage container for liquid hydrogen, wherein in cross-section, the minimum diameter of the vapor line is greater than 5 mm.

8. A device according to claim 6, wherein in cross-section the minimum diameter of the vapor line is greater than 10 mm.

9. A device according to claim 6, wherein in cross-section the minimum diameter of the vapor line is greater than 20 mm.

10. A device according to claim 1, wherein the vapor line is disposed at the top of the housing and the outlet of the vapor line is in and exhausts directly into the header space.

11. A device according to claim 1, wherein the housing and the vapor line are thermally insulated.

12. A device according to claim 1, wherein the housing and the vapor line are configured with double walls having a gap therebetween with an intake opening for vapor, liquid or a mixture of vapor and liquid.

13. A device according to claim 1, wherein a retaining device for retaining liquid is provided at the end of the vapor line, the retaining device being spaced from the inner wall surface of the housing.

14. A storage container having a floor and ceiling comprising:
- a housing disposed within the container proximate the floor thereof; the housing having at least one intake opening for liquid;
- a heating device within the housing for evaporating liquid to produce vapor bubbles, and
- a vapor line having a first opening proximate the floor of the housing and a second opening proximnate the ceiling of the housing for transmitting vapor bubbles to a space proximate the ceiling defining a head space above a maximum filling level of the storage container for collecting gas therein, the vapor line having a cross-section of a size sufficient to exhaust more vapor than liquid therethrough into the head space.

15. A storage container according to claim 14, wherein the storage container is separated into cells by numerous partitions made of low heat conduction material, the cells having a diameter in a plane perpendicular to the extent partitions which is less then 50 mm.

16. The storage container according to claim 15, wherein the cryogenic liquid is hydrogen for use in a motor vehicle.

17. The storage container of claim 15, wherein the diameter of the cells is less than 10 mm.

18. The storage container of claim 15, wherein the diameter of the cells is less than 5 mm.

19. The storage container according to claim 14, wherein the cryogenic liquid is hydrogen for use in a motor vehicle.

20. A storage container according to claim 14 wherein the heater is disposed in the vapor line adjacent the first end thereof.

21. A storage container according to claim 14 further including an outlet line in communication with the head space for dispensing the gas therefrom.

22. A storage container according to claim 21 wherein the cryogenic liquid is hydrogen and the outlet line is connected to a fuel cell.

23. A storage container according to claim 22 wherein the fuel cell is within a motor vehicle.

* * * * *